R. P. BROWN.
ELECTRICAL MEASURING INSTRUMENT.
APPLICATION FILED FEB. 12, 1913.
1,105,481.
Patented July 28, 1914.
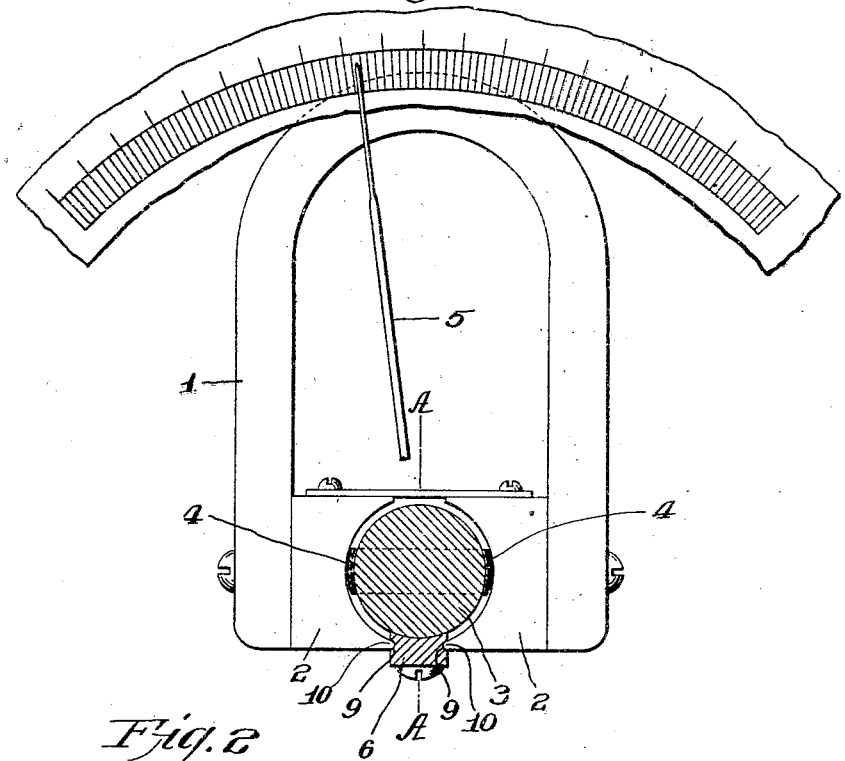
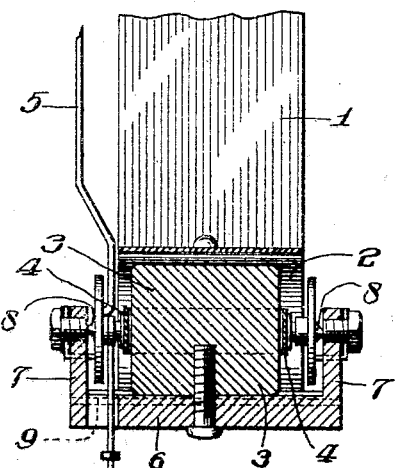
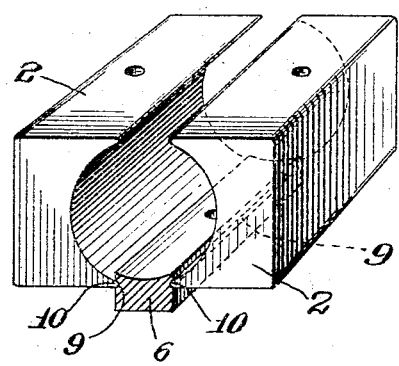
WITNESSES:
INVENTOR
Richard P. Brown
BY
Chas. A. Ritter
ATTORNEY.

UNITED STATES PATENT OFFICE.

RICHARD P. BROWN, OF PHILADELPHIA, PENNSYLVANIA, ASSIGNOR TO KEYSTONE ELECTRICAL INSTRUMENT COMPANY, OF PHILADELPHIA, PENNSYLVANIA, A CORPORATION OF PENNSYLVANIA.

ELECTRICAL MEASURING INSTRUMENT.

1,105,481.      Specification of Letters Patent.      Patented July 28, 1914.

Application filed February 12, 1913. Serial No. 747,907.

*To all whom it may concern:*

Be it known that I, RICHARD P. BROWN, a citizen of the United States, and a resident of the city and county of Philadelphia, State of Pennsylvania, have invented certain new and useful Improvements in Electrical Measuring Instruments, of which the following is a specification.

My invention relates to improvements in electrical measuring instruments and more particularly to improvements in that class of instrument which comprises a permanent magnet, a core placed between the poles or pole pieces of the magnet, a moving coil surrounding the core and a pointer actuated by the movements of the moving coil and indicating, in connection with a suitable scale, the electric current flowing through the coil.

Briefly the operation of the instrument is that of the well known Deprey D'Arsonval galvanometer but as this invention relates more particularly to an improved means for carrying the core which will permit its removal from, or insertion between, the poles or pole pieces of the magnet without there being any possibility of the core or the moving coil engaging the magnet it will be unnecessary to herein particularly describe the operation of the machine or to enter into any description of its purposes or operation. As the poles and pole pieces of a magnet are, for the purposes of my invention, substantially identical I will hereinafter refer to them as the poles it being understood that by this term I intend to include both constructions.

My invention is illustrated in the accompanying drawings which form part of this specification and in which similar numerals of reference indicate similar parts throughout the several views.

In these drawings Figure 1— is a front view of a galvanometer embodying my invention, the core and carrying bracket being shown in section: Fig. 2— a section of Fig. 1 on line A—A: Fig. 3— a perspective view of the pole pieces of a magnet and of part of a core carrying bracket carried by the tips of opposite poles of the magnet.

1 is a permanent magnet, 2 the poles or pole pieces of the magnet, 3 a core surrounded by a moving coil 4 which actuates a pointer 5 which indicates, when the instrument is properly calibrated, upon a scale the current passing through it.

6 is a bracket which carries the core, which latter, more or less frequently, for cleaning, for repairs, or when the instrument is being assembled, has to be removed from between the poles of the magnet and unless some means be provided for guiding the core while being inserted or withdrawn, the attraction of the magnet will draw the core against one or the other of the poles to the injury of the moving coil 4 which surrounds the core which is necessarily of more or less delicate construction.

My arrangement for guiding the core in inserting or withdrawing it is as follows: The bracket 6 of non-magnetic material, which carries the core 3, and which is furnished with arms 7 for carrying the pivots 8 carried by the moving coil 4 in the usual manner, is upon its opposite sides longitudinally grooved as at 9—9, these grooves are adapted to slide over the tips 10 of the poles of the magnet which form stationary guides. The core, the moving coil, the pointer and the other parts of the instrument secured to or forming parts of these several pieces are all carried by the bracket 6 and hence when this latter is moved in or out upon the tips of the poles as guides these parts are moved along with it and so long as the grooves 9 in the bracket are engaged by the tips of the poles, it is impossible for the core, or any of the other parts, to be moved out of central alinement between the poles. The space between the core and the poles of the magnet is necessarily small, this is still further reduced by the moving coil which surrounds the core and in this restricted space dust may collect which makes a removal of the core and its connected parts necessary for purposes of cleaning. It is principally for this that my invention is intended but the construction is, of course, equally useful in preventing contact of the parts in initially assembling the instrument or in taking it down to effect repairs.

The invention is, of course, applicable to instruments of all classes which employ a removable core situated between the poles or pole pieces of a magnet.

Having thus described my invention I claim as new and desire to secure by Letters Patent:—

1. The combination with a magnet and a core which is partially surrounded by the poles of said magnet, of a bar or bracket of non-magnetic material secured longitudinally to said core and adapted to be slidably engaged and carried by adjacent opposite tips of the pole pieces of said magnet.

2. The combination with a magnet and a core which is partially surrounded by the poles of said magnet, of a bracket of non-magnetic material for carrying said core the opposite sides of which are longitudinally grooved and adapted to engage the tips of the poles of the magnet.

RICHARD P. BROWN.

Witnesses:
GEORGE W. W. CORNMAN,
JOHN P. GOHEEN.